May 10, 1932.  E. J. PAULI  1,858,109
VEHICLE WINDOW
Filed Aug. 24, 1929  2 Sheets-Sheet 1
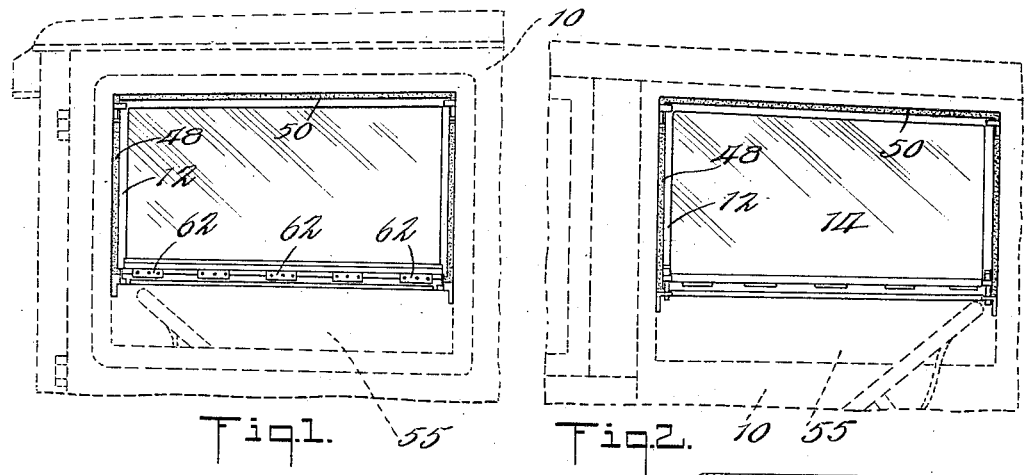
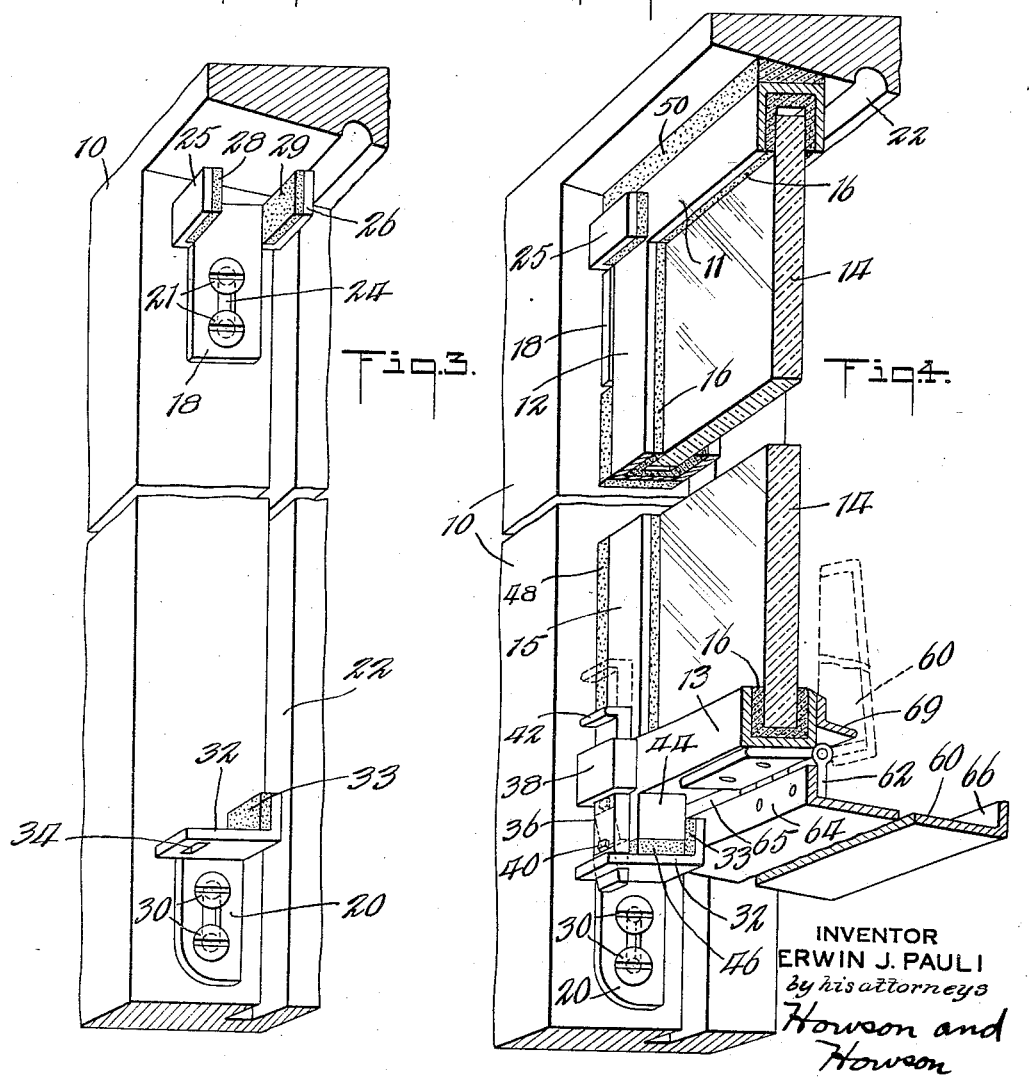
INVENTOR
ERWIN J. PAULI
by his attorneys
Howson and Howson May 10, 1932.  E. J. PAULI  1,858,109
VEHICLE WINDOW
Filed Aug. 24, 1929    2 Sheets-Sheet 2
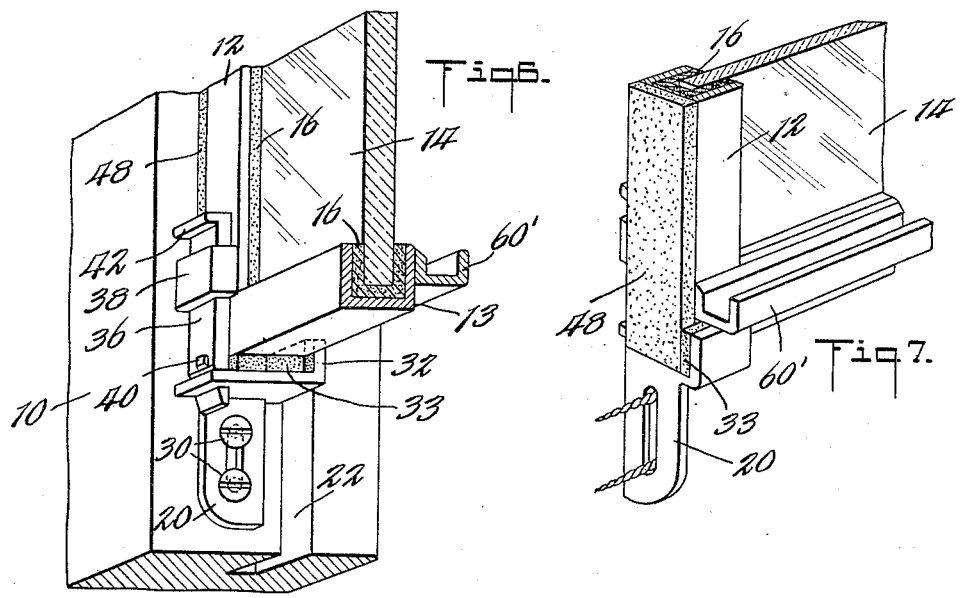
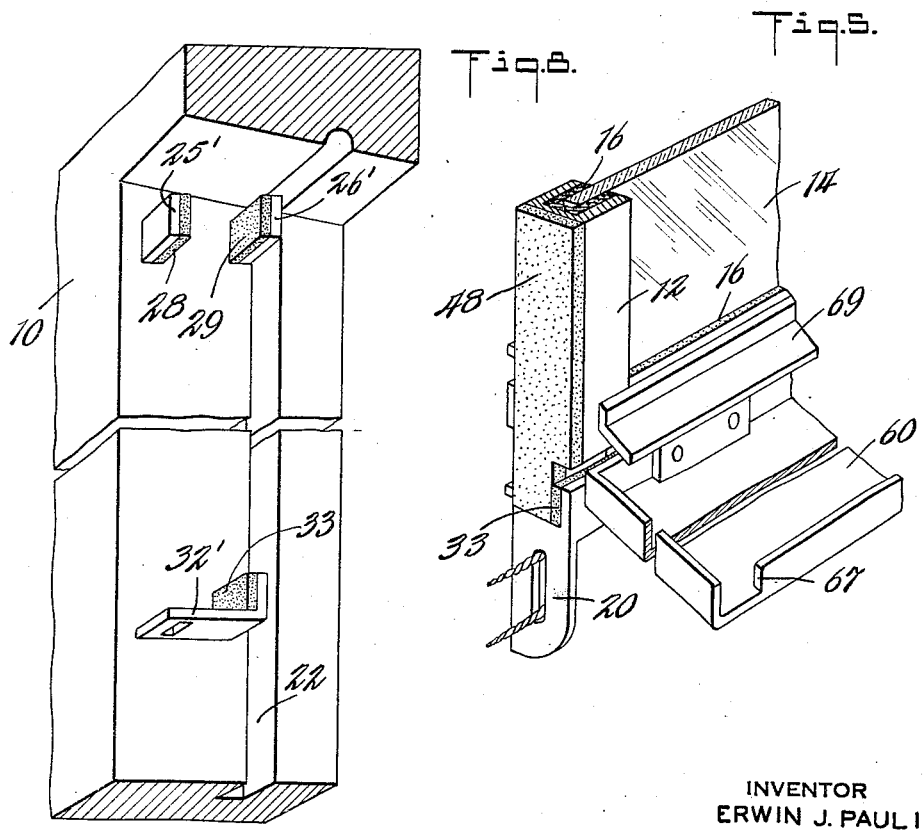
INVENTOR
ERWIN J. PAULI
by his attorneys
Howson and Howson Patented May 10, 1932

1,858,109

UNITED STATES PATENT OFFICE

ERWIN J. PAULI, OF BROOKLYN, NEW YORK

VEHICLE WINDOW

Application filed August 24, 1929. Serial No. 388,243.

In the past many attempts have been made to provide means to protect automobile drivers from rain and inclement weather by providing a window which partially closes the regular window opening in an automobile door but leaves an opening through which the arm of the operator may be extended to give manual signals. These prior devices have necessitated many additions to and changes in the door structure and generally have been difficult to construct and install.

It is an object of my invention to provide a readily removable window for the protection of vehicle drivers when they are driving in inclement weather, this window being additional and supplementary to the ordinary automobile window pane.

Another object of my invention is to provide means of the above type which may be cheaply manufactured and readily applied to existing motor vehicles.

Other objects will become apparent as my invention is described in connection with the accompanying drawings.

My invention consists of a pane of glass permanently fixed in a frame which is adapted to be removably secured as a unit to the vertical side rails or jamb of the window of an automobile door or the like.

My invention also includes a drip pan, trough or the like which may be secured to the above mentioned frame by which means rain water, sleet, snow or the like will run down off the glass into the trough and be discharge to the front or rear of the window away from the vehicle driver's arm.

In the drawings:—

Fig. 1 is a side elevation view of my vehicle window invention applied to the left side of an automobile and as seen from the outside of the automobile.

Fig. 2 is a side elevation view of my vehicle window invention applied to an automobile and seen from the inside of the automobile.

Fig. 3 is a foreshortened perspective view of one vertical side rail or jamb of the automobile door to which my invention is to be applied, showing the top and bottom supporting brackets for the window frame.

Fig. 4 is a foreshortened perspective view similar to Fig. 3 but showing the window frame held in assembled position by the supporting brackets.

Fig. 5 is a perspective view of a lower corner of my window and frame showing the drip pan foreshortened and in operative position.

Fig. 6 is a perspective view of a lower inside corner of a modified form of window frame, shown cooperating with the window jamb according to the principles of my invention.

Fig. 7 is a perspective view of a lower outside corner of the modified form of window frame shown in Fig. 6. The frame is shown resting upon the lower supporting bracket which is here removed from its customary position on the window jamb.

Fig. 8 is a perspective view of a window jamb showing a modified form of supporting brackets, which is adapted to receive either form of my window frame.

Referring to Figs. 1–5 of the drawings it will be noted that the automobile door 10 has fitted in its rectangular window opening a rectangular frame 12 of equal breadth but less height than the window opening. This frame 12 which comprises side rails 15 and top and bottom rails 11, 13, surrounds and carries a rectangular glass pane 14 which is fitted into the frame and is held from rattling by pads 16 which are fitted all the way around the edges of the pane between it and the frame 12.

To hold the frame 12 in the window opening, upper and lower supporting brackets 18 and 20 are secured to each vertical jamb of the automobile window. These brackets are placed near the top and bottom respectively of the window opening and just to the inside of the conventional window groove 22 in which the conventional automobile window (not shown) may be slid up and down as usual.

The supporting brackets 18 and 20 are susceptible of many variations in form but I prefer to use an upper bracket 18 comprising a flat rectangular metal plate centrally slotted as at 24, and having a pair of oppositely extending lateral arms 25, 26, bent to extend in the same direction in parallel planes perpendicular to the face of the plate. The bracket may be secured to the window jamb by screws or bolts 21 passing through the slots 24.

When the bracket 18 is screwed to the window jamb with the arms 25 and 26 uppermost as shown in Figs. 3 and 4, the arms will extend horizontally from the jamb and will be adapted to receive the side rail 15 of the frame 12 between them. To keep the frame from rattling between the arms 25 and 26 the arms are lined with pads 28, 29 which may be made of rubber or other suitable material.

The lower supporting bracket 20 comprises a slotted plate somewhat similar to the slotted plate of the upper bracket so that the bracket may be secured to the window jamb by screws 30 in the same manner as the upper bracket. To hold the frame in vertical position an angle member 32 is welded to or formed integrally with the plate of the bracket 20. This angle member projects from the top of the plate in planes normal thereto one leg extending horizontally while the other leg extends vertically. The inside of the vertical leg is lined with a pad 33 to prevent the rattling of the frame against it when the frame is supported on the bracket.

To secure the frame against horizontal movement on the lower supporting bracket 20 an aperture 34 is made in the horizontal leg of the angle member 32 with which aperture a bolt 36, slidably secured to the lower corner of the frame 12, is adapted to cooperate. This bolt 36 is permitted limited vertical movement within a staple 38 which preferably is formed integral with the bottom of the frame. I prefer to make the bolt 36 of rectangular cross section and taper it at its lower end in order that it may enter and be wedged into the aperture 34.

To guide the bolt in its movement the staple 38 is formed so that the opening beneath it is of approximately the same cross section as the bolt 36.

To limit the upward movement of the bolt a lug 40 may be soldered, welded or otherwise secured upon the surface of the bolt near the lower end where the bolt end starts to taper. This lug 40 will encounter the bottom side of the staple 38 when the bolt is raised a given distance and thus limit further upward movement. The downward movement of the bolt is limited by a laterally projecting ledge 42 at the top of the bolt. This ledge also serves as a means for raising the bolt to remove its tapered end from the aperture 34.

While if desired the bottom rail 13 of the frame 12 may rest upon the lower bracket 20, as shown in Figure 6, I prefer to provide short legs 44 at the bottom of the side rails 15 of the frame to raise the frame slightly above the lower brackets for a purpose that will be presently described. To prevent rattling, pads 46, 48, 50 of rubber or other suitable material may be provided under the legs 44, between the side rails of the frame and the window jamb, and between the top of the frame and the top of the window opening.

Although I have described the brackets and bolt in connection with one side of the window jamb and frame it will be apparent that similarly shaped and situated brackets and bolt are located at the other side of the window. With the frame 14 held by these brackets it will be apparent that an open area 55, the full length of the window opening will be left below the frame through which the arm and hand of the automobile operator may be conveniently extended to give traffic signals.

It will be apparent also that rain water and the like may drip from the window frame upon the operator's arm while it is extended. To prevent this dripping I provide a rectangular drip pan 60 which may be made the length of the frame 12 and as wide as desired. preferably one edge 64 of the pan is hinged by hinges 62 to the bottom of the frame 12 in such a way that the pan may be rotated from a position slightly below horizontal (full line position of Fig. 4), wherein the pan is retained by its own weight and by the back edge 64 of the pan resting against the lower brackets 20, to a position slightly past vertical (dotted line position of Fig. 4), wherein the pan is held by the friction in the hinges 62 or any suitable catch which may be provided as the occasion demands.

The horizontal position is the operative position of the pan and the vertical position is the inoperative position in which the pan may be placed when it is not needed. It will be noted that the back of the drip pan, when the pan is in operative position, rests against the lower brackets 20 due to the fact that the frame is slightly elevated above them by legs 44.

In order that water may not run through the crack 65 between the hinged cage 64 of the drip pan 60 and the bottom rail 13 of the frame 12 when the pan is in operative position, I provide a lip composed of an oblique angle bar 69 secured to the outside of the bottom rail of the frame in such a way that one leg of the angle overhangs the lower edge of the bottom rail 13 of the frame 12 and hence carries the water over the crack 65 and into the pan 60.

The front edge 66 of the drip pan has slots 67 cut at its ends to allow the water to drain from the pan. Since practically all the water will drain at the rear slot when the car is in motion no drops will fall on the driver's arm. When the car is standing still the water can drain from both the front and rear slots both of which are away from the operator's arm.

In Figures 6 and 7 I have shown a modified form of drip pan. In this modification a channel iron trough 60' is rigidly secured by soldering, welding or otherwise to the outside of the bottom rail of the frame 12. The ends of the trough in this modification are open in order that water may drain therefrom as it runs down into the trough from the window.

In Figure 8 I have shown a modified means to support the frame 12. In this modification the plates, upon which the arms or legs 25, 26, and angle members 32 were formed as shown in Figures 3, 4, 6, are dispensed with and the arms or legs 25' 26' and angle member 32' are welded, soldered or otherwise secured directly to the window jambs.

Although in both the modifications shown the drip pan or trough is permanently secured to the window it is obvious that the drip pan may be removably secured if desired, and such a construction is within the scope of my invention.

From the foregoing description, it will be apparent that when my invention is applied to the window opening of an automobile, a space for the driver's arm is provided below the pane. This space may be closed by raising the conventional or ordinary window to the window I have provided. In this way the whole window opening may be closed when desired.

Many modifications and changes within the scope of my invention will occur to those skilled in the art. Therefore I do not limit myself to the specific embodiment shown.

I claim:

1. A motor vehicle having a window opening with a side rail, upper and lower supporting brackets located on said side rail, in combination with a window comprising a pane permanently secured in a frame, a bolt on said frame, said upper supporting bracket having arms adapted to embrace said frame, said lower supporting bracket having an aperture adapted to cooperate with said bolt, all to hold said frame in assembled position in said window opening.

2. A motor vehicle having a window opening with side rails, a plurality of upper and lower supporting brackets located on said side rails, in combination with a window comprising a pane permanently secured in a frame, slidable bolts secured to said frame, said upper brackets having arms adapted to embrace said frame, said lower supporting brackets having apertures therein adapted to cooperate with said bolts, all to hold said frame in assembled position.

3. A motor vehicle having a window opening, in combination with a window comprising a pane permanently secured in a frame, means to removably secure said frame in said window opening, and means located beneath said pane to divert water running down off said window to the sides of said window opening, said last mentioned means being rotatable from an approximately horizontal operative position to an approximately vertical inoperative position.

4. A window comprising a pane, a frame, said pane adapted to be secured in said frame, a drip pan hingedly secured to the bottom portion of said frame to catch water running down off of said pane, said drip pan being adapted to divert the drainage from said pane to points at the sides thereof.

5. A window comprising a pane, a frame, said pane adapted to be secured in said frame, a drip pan hingedly secured to the bottom rail of said frame to catch water running down off said pane, said drip pan being adapted to divert the drainage from said pane to points at the sides thereof, in combination with a motor vehicle having a window opening, means located at the sides of said opening whereby said frame, pane, and drip pan may be removably secured in said window opening, as a unit.

6. A window comprising a pane, a frame, said pane adapted to be secured in said frame, a drip pan hingedly secured to the bottom rail of said frame, and a lip secured to said frame, to prevent water running down the pane from running in between the pan and the frame.

7. A window, adapted to be readily inserted into and removed from the upper part of a window opening, comprising a pane secured in a frame, a bolt secured to the bottom of said frame, brackets secured to the side rail of a window opening to hold said frame in assembled position therein and one of the brackets having an aperture adapted to cooperate with said bolt.

8. A window, adapted to be readily inserted into and removed from a window opening, comprising a pane secured in a frame, bolts secured to the bottom of said frame, brackets secured to the side rails of a window opening to hold said window in assembled position therein, some of said brackets having arms adapted to embrace said frame, others of said brackets having apertures adapted to cooperate with said bolts.

9. A window comprising a pane secured in a frame, said frame having a bolt thereon, arms rigidly secured to the side rails of a window opening and adapted to embrace said frame, a bracket secured to the side rail of the window opening, said bracket having an aperture cooperating with said bolt, all in order that said window may be held in a window opening.

In testimony whereof I have signed my name to this specification.

ERWIN J. PAULI.